US009462745B1

(12) United States Patent
Jivanjee, Jr.

(10) Patent No.: US 9,462,745 B1
(45) Date of Patent: Oct. 11, 2016

(54) LAWN AND TREE FERTILIZING DEVICE INSTALLABLE ON A SPRINKLER SYSTEM

(71) Applicant: Mehboob H. Jivanjee, Jr., Miami, FL (US)

(72) Inventor: Mehboob H. Jivanjee, Jr., Miami, FL (US)

( * ) Notice: Subject to any disclaimer, the term of this patent is extended or adjusted under 35 U.S.C. 154(b) by 0 days.

(21) Appl. No.: 14/690,742

(22) Filed: Apr. 20, 2015

Related U.S. Application Data

(63) Continuation-in-part of application No. 13/690,301, filed on Nov. 30, 2012, now Pat. No. 9,010,662, which is a continuation-in-part of application No. 12/701,072, filed on Feb. 5, 2010, now Pat. No. 8,342,427.

(51) Int. Cl.
*A62C 5/02* (2006.01)
*A01C 23/04* (2006.01)
*A01C 23/00* (2006.01)

(52) U.S. Cl.
CPC .......... *A01C 23/042* (2013.01); *A01C 23/007* (2013.01)

(58) Field of Classification Search
CPC ... A01G 25/00; A01G 23/007; A01G 23/042
USPC ............. 239/310, 315, 316, 569, 379, 302
See application file for complete search history.

(56) References Cited

U.S. PATENT DOCUMENTS

| | | | |
|---|---|---|---|
| 3,833,177 A | 9/1974 | Pasley et al. | |
| 4,750,512 A | 6/1988 | Craig | |
| 4,898,202 A | 2/1990 | Craig | |
| 4,908,190 A | 3/1990 | Maglio et al. | |
| D325,328 S | 4/1992 | Smiley | |
| 5,364,030 A | 11/1994 | Murdock et al. | |
| 5,730,364 A | 3/1998 | Gertie | |
| 8,342,427 B1 | 1/2013 | Jivanjee, Jr. | |
| 9,010,662 B1 * | 4/2015 | Jivanjee, Jr. | A01C 23/042 239/310 |
| 2002/0145057 A1 | 10/2002 | Leedy et al. | |
| 2006/0202057 A1 | 9/2006 | Taggart et al. | |

OTHER PUBLICATIONS www.ridsystem.com; Retrofit Irrigation Distribution System; Internet as of Feb. 5, 2010.

* cited by examiner

*Primary Examiner* — Davis Hwu

(57) ABSTRACT

A lawn fertilizing device for installing in a water system. A chemical substrate that is to be applied to vegetation is disposed in an enclosed container. The enclosed container has a plurality of apertures disposed on the container walls to allow water to flow through the container and contact the chemical substrate. The container is placed on a base and covered by a housing. The housing is secured to the base via a screw cap threaded to a base wall.

15 Claims, 4 Drawing Sheets

LAWN AND TREE FERTILIZING DEVICE INSTALLABLE ON A SPRINKLER SYSTEM

CROSS REFERENCE

This application claims priority to and is a continuation-in-part of U.S. patent application Ser. No. 13/690,301, filed Nov. 30, 2012, which is a continuation-in-part of U.S. Non-Provisional application Ser. No. 12/701,072 filed Feb. 5, 2010 the specification(s) of which is/are incorporated herein in their entirety by reference.

FIELD OF THE INVENTION

The present invention is related to a fertilizing device for fertilizing landscaping, such as trees or lawns, or for dispersing insecticide. More particularly, the present invention is related to a fertilizing device that can be installed on an existing sprinkler system.

BACKGROUND OF THE INVENTION

Housing booms have integrated lawns as part of residential living. As a result, lawn and garden care is a multi-million-dollar industry as there is a strong underlying demand for lawn and garden products and services. Due to increased demand, lawn and garden has been one of the most productive categories for hardware stores and home centers.

Watering plants and applying treatments such as fertilizer, insecticide, or herbicide are most often performed separately. Water can be distributed to the lawn, trees, and shrubs via a hose or sprinkler devices and systems, while fertilizer is sprayed on or scattered throughout the lawn with a spreader. Landscaping and lawn maintenance can consume a great deal of time, money, and resources. Hence, there is a need for systems that can be easily installed to an existing water system and simultaneously water and fertilize a lawn or other area.

The present invention features a device that can be easily integrated to an already-installed watering system and that can distribute fertilizer, insecticide, or herbicide through the watering system, which would allow multiple tasks to be completed at one time. The present invention simplifies the lawn maintenance process while significantly reducing the high expenses and hazards required to have a healthy and beautiful lawn. The present invention also allows for chemical substance to be dispensed evenly over the expanse of a lawn.

For example, once the water is turned on, the water would mix with the fertilizer and other lawn chemicals in the device, and then the mixture would be distributed to a lawn and landscape through sprinklers. The coverage area associated with this sprinkler system accessory would be much greater than the amount of land nourished by conventional distribution methods. Fertilizer, insecticide, and herbicide can be applied at the same time.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a lawn fertilizing device comprising a tubular housing, a screw cap, a base, an enclosed container, and a chemical substrate. The chemical substrate may be disposed in the enclosed container. The enclosed container may have apertures to allow water to flow through the container and contact the chemical substrate. The container may be placed on the base or removeably attached to the base, and covered by the housing. The housing may be secured to the base via the screw cap threaded to the base. The device may be installed to a watering system such as sprayer, a sprinkler, or a water pump.

DESCRIPTION OF PREFERRED EMBODIMENTS

Figure 1:
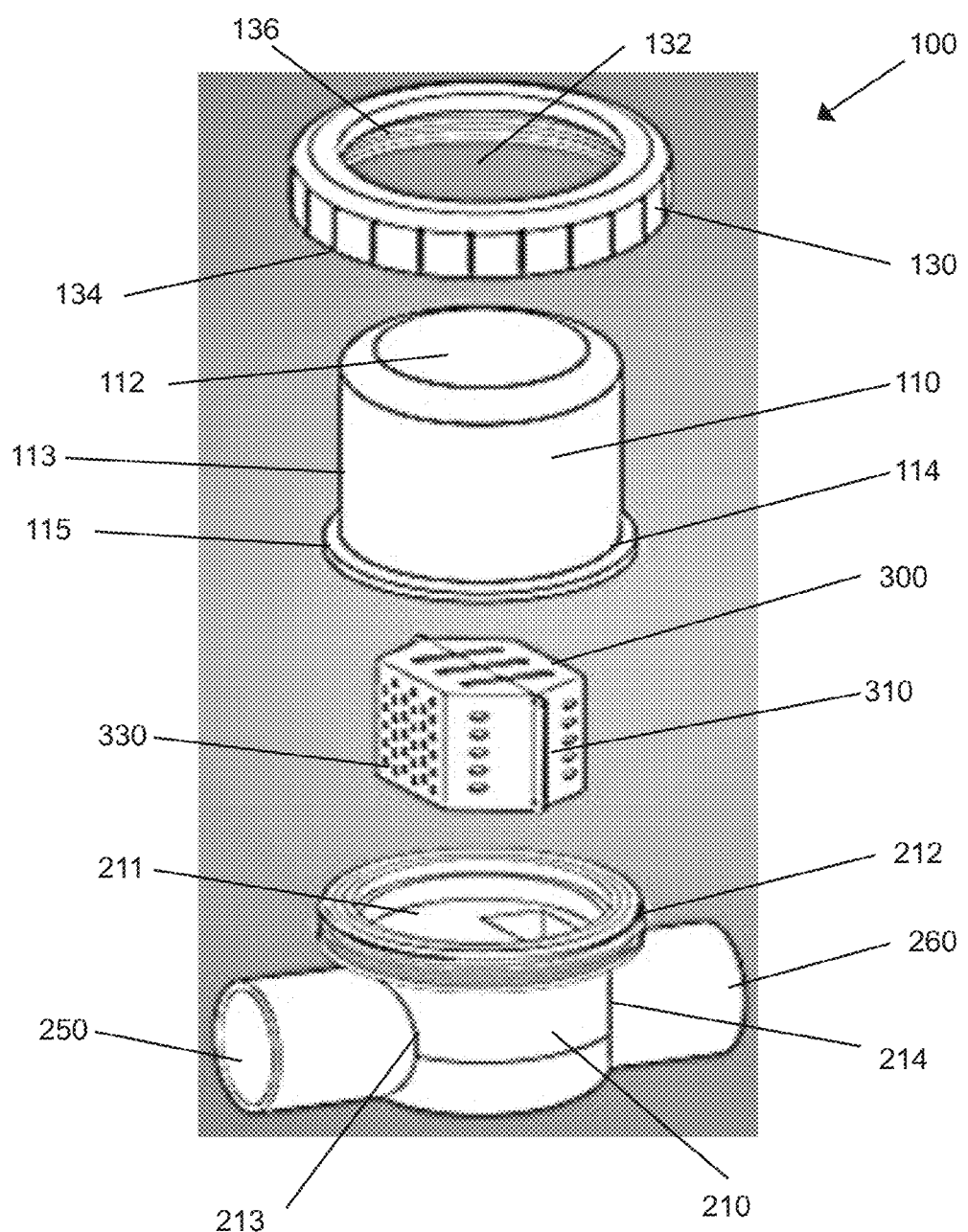
FIG. 1 shows an exploded perspective view of the present invention.
Figure 2:
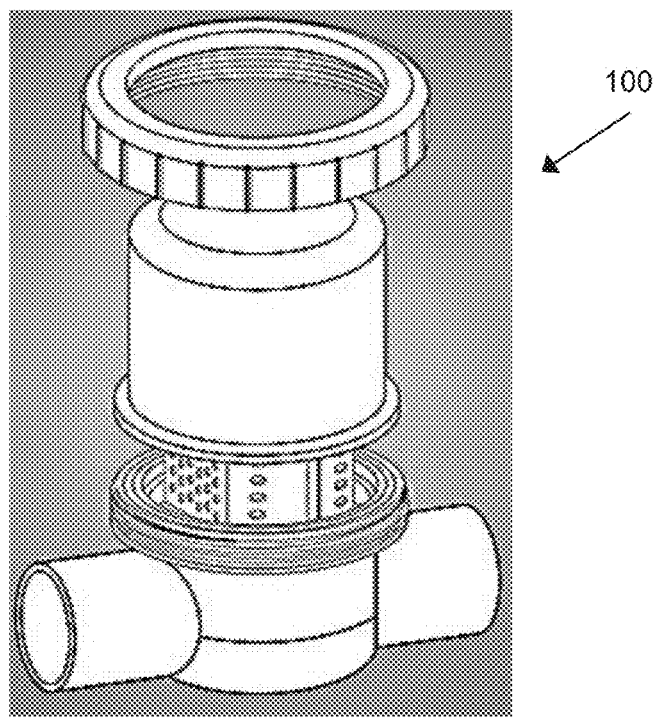
FIG. 2 shows an exploded perspective view of the present invention.
Figure 3:
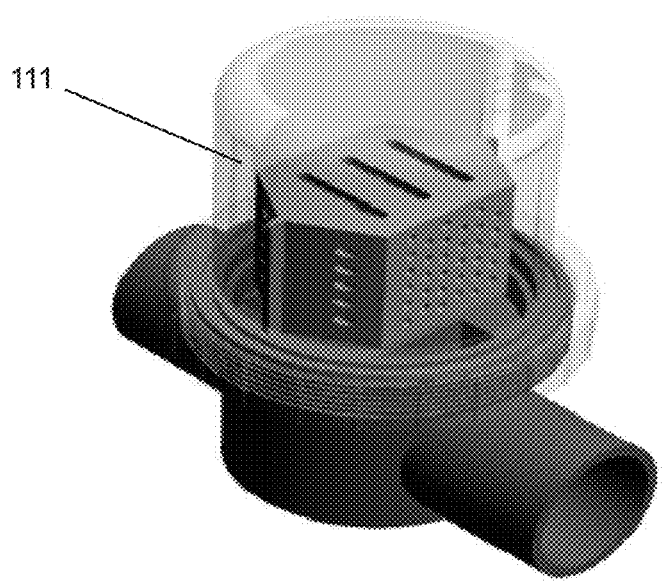
FIG. 3 shows a perspective view of the present invention.
Figure 4:
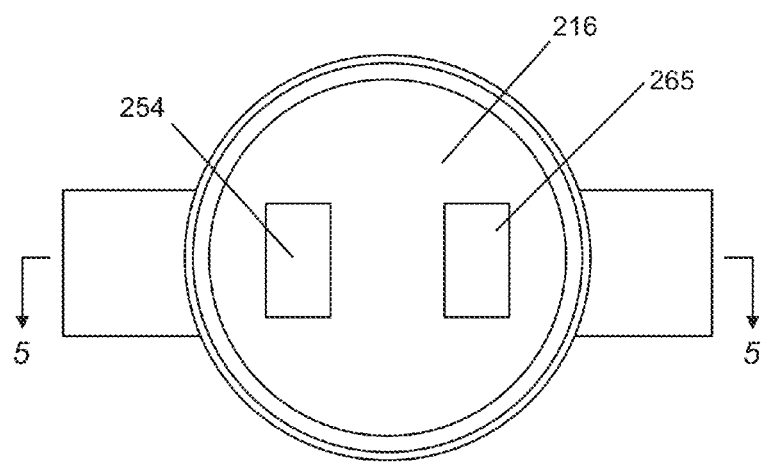
FIG. 4 shows a top view of a base of the present invention.
Figure 5:
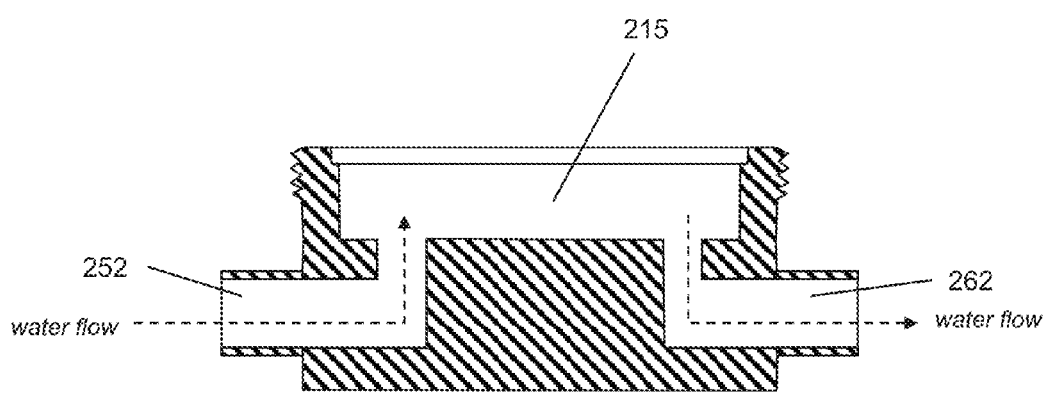
FIG. 5 shows a cross-sectional view of FIG. 4 of the present invention.
Figure 6:
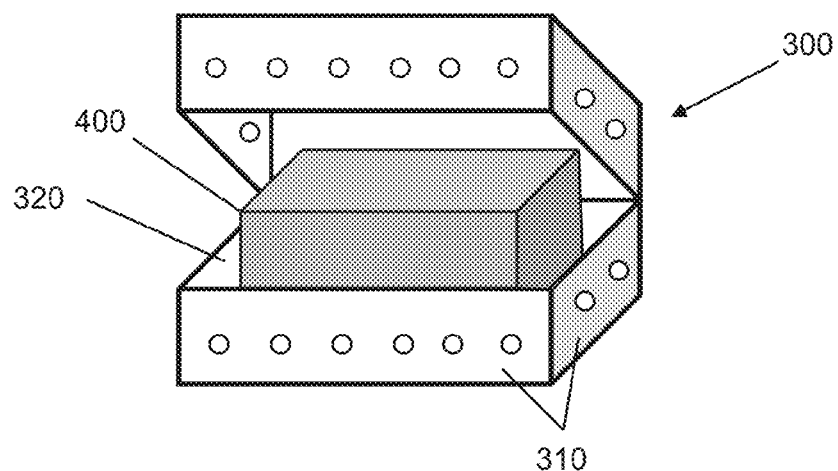
FIG. 6 shows a perspective view of a container with a chemical substrate of the present invention.
Figure 7:
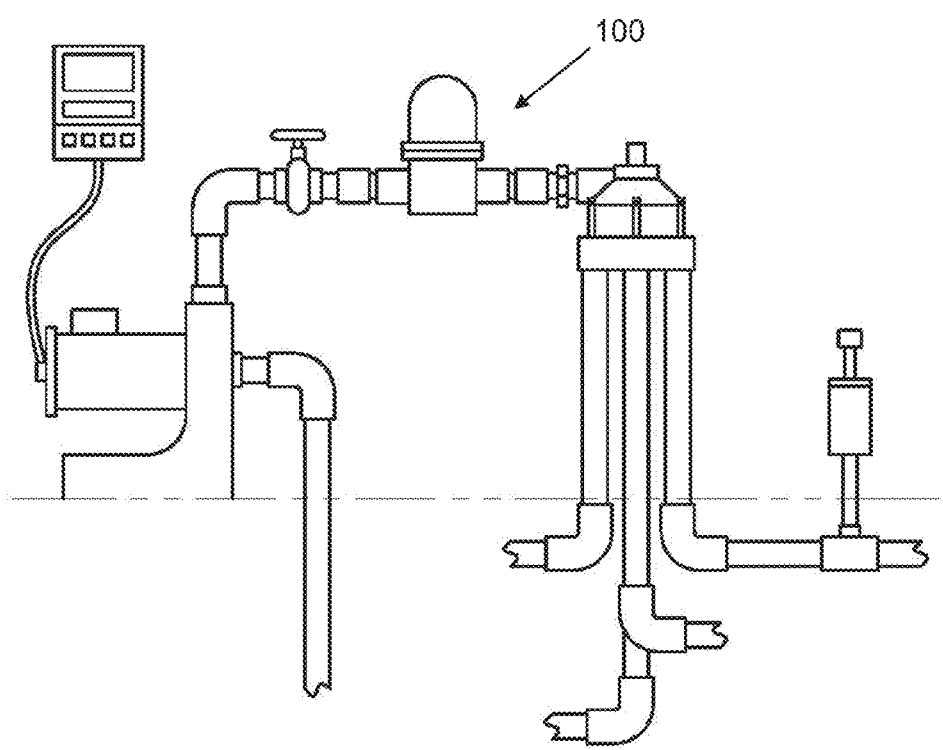
FIG. 7 shows the present invention in use with a water system.

Following is a list of elements corresponding to a particular element referred to herein:
- 100 lawn fertilizing device
- 110 housing
- 111 inner chamber
- 112 top surface
- 113 side wall
- 114 lower end
- 115 lower end rim
- 130 screw cap
- 132 top opening
- 134 lower opening
- 136 inner thread
- 210 base
- 211 base platform
- 212 base wall
- 213 base first side
- 214 base second side
- 215 base inner cavity
- 216 base top side
- 250 inlet pipe
- 252 first base inner channel
- 254 base outlet end
- 260 outlet pipe
- 262 second base inner channel
- 265 base inlet end
- 300 container
- 310 container wall
- 320 inner space
- 330 plurality of apertures
- 400 chemical substrate Referring now to FIG. 1-7, the present invention features a lawn fertilizing device (100) for installing in a water system. In some embodiments, the lawn fertilizing device comprises a tubular housing (110), a screw cap (130), a base (210), an enclosed container (300), and a chemical substrate (400). In some embodiments, the tubular housing (110) may have a top surface (112) and a side wall (113). The top surface (112) and a side wall (113) can form an inner chamber (111). In other embodiments, a lower end rim (115) is disposed on a lower end (114) of the housing (110).

In some embodiments, the screw cap (130) has a top opening (132), a lower opening (134), and an inner thread (136) is disposed within the screw cap. In some embodiments, the tubular housing (110) slidably passes through the lower opening (134) and out of the top opening (132) such that the screw cap (130) stops at the lower end rim (115).

In some embodiments, the base (210) comprises a base platform (211), a threaded base wall (212), a base first side (213) and an opposing base second side (214). The threaded base wall (212) is disposed on a base top side (216) of the base platform (211) to form a base inner cavity (215). In some embodiments, the threaded base wall (212) is configured to engage the inner thread (136) of the screw cap (130) such that the tubular housing (110) is removably and water-tightly attached to the base (210). The base inner cavity (215) is fluidly connected to the inner chamber (111) of the tubular housing (110) when the tubular housing (110) is attached to the base (210).

In some embodiments, an inlet pipe (250) is disposed on the base first side (213) and an outlet pipe (260) is disposed on the base second side (214) opposite of the inlet pipe (250). In some embodiments, the inlet pipe (250) and outlet pipe (260) are disposed below the base top side (216), i.e. the base platform (211) is above the inlet pipe (250) and outlet pipe (260). In some embodiments, the inlet pipe (250) is fluidly connected to the base inner cavity (215) via a first base inner channel (252) having a base outlet end (254) disposed on the base top side (216). In other embodiments, the outlet pipe (260) is fluidly connected to the base inner cavity (215) via a second base inner channel (262) having a base inlet end (265) disposed on the base top side (216). For example, the first base inner channel (252) and the second base inner channel (262) may be curved channels or L-shape channels or straight channels angled upwardly towards the base platform (211).

In some embodiments, the enclosed container (300) comprises container walls (310) and a plurality of apertures (330) disposed through at least a portion of the container walls (310). The container (300) may further comprise an inner space (320) formed by container walls (310). In some embodiments, the container (300) is disposed on the base top side (216) in between the base outlet end (254) and the base inlet end (265). In some embodiments, the container (230) is disposed within the base inner cavity (215) and inner chamber (111) of the tubular housing (110) when the tubular housing (110) is attached to the base (210). In some embodiments, the chemical substrate (400) disposed within the inner space (320) of the container (300). In some embodiments, the plurality of apertures (330) allows water to enter the container (300) and contact the chemical substrate (400).

In some embodiments, the water enters the inlet pipe (250), flows upwardly through the first base inner channel (252) and exits through the base outlet end (254) to enter the base inner cavity (215). The water then enters the container (300) via the plurality of apertures (330) and mixes with the chemical substrate (400) to form a chemical mixture. The chemical mixture subsequently enters the base inlet end (265), flows downwardly through the second base inner channel (262), and finally exits the base (210) from the outlet pipe (260).

In some embodiments, the tubular housing (110) is cylindrical in shape. In other embodiments, the tubular housing (110) is in a shape of a dome. Preferably, the housing (110) is of sufficient size and has a shape for covering the container (300) and allowing for contact and mixing of the water and chemical substrate (400). The housing (110) is not limited to the aforementioned shapes. In some embodiments, the housing (110) is non-transparent. For example, the housing (110) may be constructed from a white or black PVC material. In other embodiments, the housing may be transparent or semi-transparent.

In some embodiments, the container (300) is polyhedral in shape. For example, the container (300) is in the shape of a cube, a cylinder, or a box. For example, the container (300) may be a box having a lid, a hinge and a locking mechanism. The box container is openable by disengaging a latch to open the box lid and the chemical substrate (400) is placed inside the box container. In another example, the container (300) may be a tube having a removable lid. The lid may be a twist cap or a snap-on cap. The container (300) is not limited to the aforementioned configurations.

In some embodiments, the container (300) may be removably attached to the base (210) via an anchoring mechanism. For example, the container (300) may have loops on the container walls (310) and the base platform may have hooks that connect to the loops to hold the container (300) in place. Any suitable anchoring mechanism may be used for securing the container (300) to the base (210).

In some embodiments, the chemical substrate (400) comprises fertilizer, herbicide, insecticide, weed killer or a combination thereof.

In preferred embodiments, the chemical substrate (400) has a size larger than the size of each aperture (330) in order to prevent the chemical substrate (400) from coming out through the apertures (330). For example, each aperture (330) is sized such that only fluid can enter and exit the container (300). In some embodiments, the chemical substrate (400) is in a form of a bar. In other embodiments, the chemical substrate (400) is in a form of pellets. In still other embodiments, the chemical substrate (400) is in a form of granules contained within a permeable bag. For example, the permeable bag is made from a mesh cloth material for holding the granules (similar to a tea bag), and the permeable bag is placed inside the container.

In some embodiments, the base wall (212) is preferably cylindrical in shape. In some embodiments, the base platform (211) is circular in shape. In other embodiments, the base platform (211) is in a shape of a square. However, the base platform (211) or the base wall (212) is not limited to the aforementioned configurations.

In some embodiments, the inlet pipe (250) is connectable to a first portion of a main pipe of the water system and the outlet pipe (260) is connectable to a second portion of the main pipe of the water system. For example, the water from the water system enters the base (210) via the inlet pipe (250), then mixes with the chemical substrate (400), and finally exits the base (210) via the outlet pipe (260).

In some embodiments, the water system is a sprinkler. In other embodiments, the water system is a hose. In still other embodiments, the device (100) is operatively connected to a water pipe system of a building. For example, the device (100) may be installed to a lawn watering system such as a residential greywater system.

In some embodiments, a gasket is disposed between the screw cap (130) and the lower end rim (115) to create a water-tight seal. In other embodiments, a gasket is disposed between the lower end rim (115) and the threaded base wall (212) to create a water-tight seal. The gasket may be an o-ring or a rubberized material.

As used herein, the term "about" refers to plus or minus 10% of the referenced number.

The following the disclosures of the following U.S. Patents are incorporated in their entirety by reference herein: U.S. Pat. Application No. 2002/0145057; U.S. Pat. Application No. 2006/0202057; U.S. Pat. No. 5,730,364; U.S. Pat. No. 3,833,177; U.S. Pat. No. 5,364,030.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A lawn fertilizing device (100) for installing in a water system, said lawn fertilizing device comprising:
   a. a tubular housing (110) having a top surface (112) and a side wall (113) forming an inner chamber (111), wherein a lower end rim (115) is disposed on a lower end (114) of the housing (110);
   b. a screw cap (130) with a top opening (132) and a lower opening (134), wherein an inner thread (136) is disposed within the screw cap, wherein the tubular housing (110) slidably passes through the lower opening (134) and out of the top opening (132) such that the screw cap (130) stops at the lower end rim (115);
   c. a base (210) having a base platform (211), a threaded base wall (212), a base first side (213) and an opposing base second side (214), wherein the threaded base wall (212) is disposed on a base top side (216) of the base platform (211) to form a base inner cavity (215), wherein the threaded base wall (212) is configured to engage the inner thread (136) of the screw cap (130) such that the tubular housing (110) is removably and water-tightly attached to the base (210), wherein the base inner cavity (215) is fluidly connected to the inner chamber (111) of the tubular housing (110) when the tubular housing (110) is attached to the base (210), wherein an inlet pipe (250) is disposed on the base first side (213) and an outlet pipe (260) is disposed on the base second side (214) opposite of the inlet pipe (250), wherein the inlet pipe (250) and outlet pipe (260) are disposed below the base top side (216), wherein the inlet pipe (250) is fluidly connected to the base inner cavity (215) via a first base inner channel (252) having a base outlet end (254) disposed on the base top side (216), wherein the outlet pipe (260) is fluidly connected to the base inner cavity (215) via a second base inner channel (262) having a base inlet end (265) disposed on the base top side (216);
   d. an enclosed container (300) having an inner space (320) formed by container walls (310) and a plurality of apertures (330) disposed through at least a portion of the container walls (310), wherein the container (300) is disposed on the base top side (216) in between the base outlet end (254) and the base inlet end (265), wherein the container (300) is disposed within the base inner cavity (215) and inner chamber (111) of the tubular housing (110) when the tubular housing (110) is attached to the base (210); and
   e. a chemical substrate (400) disposed within the inner space (320) of the container (300), wherein the plurality of apertures (330) allows water to enter the container (300) and contact the chemical substrate (400); wherein the water enters the inlet pipe (250), flows through the first base inner channel (252) and upwards to exit through the base outlet end (254) and enter the base inner cavity (215), wherein the water enters the container (300) and mixes with the chemical substrate (400) to form a chemical mixture, wherein the chemical mixture subsequently enters the base inlet end (265), flows through the second base inner channel (262) and downwards to exit the base (210) from the outlet pipe (260).

2. The lawn fertilizing device (100) of claim 1, wherein the tubular housing (110) is cylindrical in shape.

3. The lawn fertilizing device (100) of claim 1, wherein the container (300) is polyhedral in shape.

4. The lawn fertilizing device (100) of claim 1, wherein the chemical substrate (400) comprises fertilizer, herbicide, insecticide, or a combination thereof.

5. The lawn fertilizing device (100) of claim 1, wherein the chemical substrate (400) has a size larger than a size of each aperture (330).

6. The lawn fertilizing device (100) of claim 1, wherein the chemical substrate (400) is in a form of a bar.

7. The lawn fertilizing device (100) of claim 1, wherein the chemical substrate (400) is in a form of pellets.

8. The lawn fertilizing device (100) of claim 1, wherein the housing (110) is non-transparent.

9. The lawn fertilizing device (100) of claim 1, wherein the base wall (212) is cylindrical in shape.

10. The lawn fertilizing device (100) of claim 1, wherein the base platform (211) is circular in shape.

11. The lawn fertilizing device (100) of claim 1, wherein the inlet pipe (250) is connectable to a first portion of a main pipe of the water system and the outlet pipe (260) is connectable to a second portion of the main pipe of the water system, wherein water from the water system enters the base (210) via the inlet pipe (250) and flows upwardly, then mixes with the chemical substrate (400), and finally flows downwardly and exits the base (210) via the outlet pipe (260).

12. The lawn fertilizing device (100) of claim 1, wherein the water system is a sprinkler.

13. The lawn fertilizing device (100) of claim 1, wherein the water system is a hose.

14. The lawn fertilizing device (100) of claim 1, wherein a gasket is disposed between the screw cap (130) and the lower end rim (115) to create a water-tight seal.

15. The lawn fertilizing device (100) of claim 1, wherein a gasket is disposed between the lower end rim (115) and the threaded base wall (212) to create a water-tight seal.

* * * * *